United States Patent [19]

Nishioka et al.

[11] Patent Number: 5,327,313
[45] Date of Patent: Jul. 5, 1994

[54] MAGNETORESISTANCE EFFECT TYPE HEAD HAVING A DAMAGE IMMUNE FILM STRUCTURE

[75] Inventors: Kouichi Nishioka, Hiratsuka; Shigeru Tadokoro, Hitachi; Shinji Narishige, Mito, all of Japan

[73] Assignee: Hitachi, Ltd., Tokyo, Japan

[21] Appl. No.: 922,472

[22] Filed: Jul. 31, 1992

[30] Foreign Application Priority Data

Aug. 1, 1991 [JP] Japan .................. 3-192418

[51] Int. Cl.$^5$ ............................................. G11B 5/127
[52] U.S. Cl. ...................................................... 360/113
[58] Field of Search ........................................ 360/113

[56] References Cited

U.S. PATENT DOCUMENTS 5,159,513 10/1992 Dieny ................... 360/113

Primary Examiner—A. J. Heinz
Attorney, Agent, or Firm—Antonelli, Terry, Stout & Kraus

[57] ABSTRACT

A magnetoresistance effect type head including a ceramic substrate, a first magnetic film provided on the ceramic substrate, a second magnetic film provided above the first magnetic film, first and second insulating films provided between the first and second magnetic films, a magnetoresistance effect type film provided between the first and second insulating films, a bias film provided between the first and second insulating films in contact with the magnetoresistive film for applying magnetic field to the magnetoresistive film, a first conductive film provided between the first and second insulating films and above the bias film to be nearly as thick as the mean free path of free electrons, and a second conductive film of an electrode structure mutually separated between the first and second insulating films in contact with the first conductive film. The first conductive film is a nickel-chromium film or a chromium film which is resistive to a fluorocarbon-series gas to be used for etching. The second conductive film is made of a metal which is etched with a fluorocarbon-series gas and which has a thickness of 200 nm or more. The bias film and the magnetoresistance effect type film are protected from over-etching. The second conductive layer is made up of two metallic layers having contact tightness with the second insulating film and a third metallic layer which is sandwiched between the two metallic layers and which has a conductivity larger than the two metallic layers and also a thickness larger than the two metallic layers.

15 Claims, 7 Drawing Sheets

MAGNETORESISTANCE EFFECT TYPE HEAD HAVING A DAMAGE IMMUNE FILM STRUCTURE

BACKGROUND OF THE INVENTION

The present invention generally relates to a magnetoresistance effect type head and a manufacturing method therefor and, more particularly, to a technique which can be effectively used for a magnetic head of a magnetic disc device or the like.

A magnetoresistive head is a reproduction exclusive head utilizing such a phenomenon that the electric resistance of a magnetoresistance effect type film, which will be sometimes referred to merely as the MR film, hereinafter, varies depending on its magnetizing direction.

The magnetoresistive head comprises lower and upper magnetic shield films made of magnetic material and an MR element disposed between the upper and lower magnetic shield films. The MR element has an MR film, bias films for applying a horizontal bias to the MR film, and a pair of conductive electrodes for passing a signal detection signal to the MR film. A magnetic domain control layer may be provided in the MR element to provide a single magnetic domain to the MR film. A current is continuously passed to the MR film through the conductive electrodes, and a voltage between the electrodes is continuously detected. When a leak magnetic field ranging from a magnetic recording medium to the MR film varies, this causes the magnetizing direction of the MR film to be varied so that the resistance of the MR film is changed and a signal is generated between the electrodes. In this manner, information is reproduced from the medium.

The processes for forming the electrodes and MR film of the prior art MR element include (a) formation of the MR film on the electrodes and (b) formation of the electrodes on the MR film.

The process (a) has a problem that the formation of the MR film on the electrodes involves the formation of steps in the MR film and the formation of magnetic walls in the steps, which results in generation of Barkhausen noise at the time of reproduction.

The process (b) can avoid such a problem as the formation of the steps in the MR film unlike the process (a), but process (b) is defective in that the formation of the electrodes on the MR film causes damage of the MR film. More specifically, when an electrode film is formed on the MR film and then subjected to an ion milling for formation of the electrodes for example, the MR film is damaged because of its subjection to ions.

For the purpose of minimizing the damage of the MR film, there has been suggested an electrode processing method which is based on a reactive ion etching. In this method, as shown in JP-A-Hei 4-3306, a film Nb, Ta, Ti or the like capable of being subjected to a dry etching with use of such a fluorocarbon gas as a $CF_4$ gas for formation of electrodes, or a film of Au, Pt, Cr or the like capable of being subjected to an etching with use of a chlorine-series gas, is formed on an MR or bias film subjected to a patterning of a predetermined shape, and subsequently the etched film is subjected to an etching to form electrodes having a desired shape. During the over-etching for the formation of the electrodes with use of the fluorocarbon gas or chlorine-series gas, the MR or bias film is subjected to the etching and therefore damaged.

Disclosed in JP-A-63-117309 (U.S. Pat. No. 4,713,708) is a magnetoresistance effect type head reader/converter in which a spacer film and a soft magnetic thin film are provided on an MR film. This invention also discloses vertical/horizontal biasing effects based on the use of a vertical bias film and a soft bias film.

SUMMARY OF THE INVENTION

It is an object of the present invention to provide a magnetoresistive head and a manufacturing method therefor which can prevent the damage of MR and bias films when subjected to an electrode processing process with use of a gas and thus which can improve its performances.

Another object of the present invention is to provide a magnetoresistive head which can prevent the damage of MR and bias films when a first conductive film formed on a second conductive film is subjected to a reactive ion etching for formation of electrodes and thereby which can improve its performances.

Typical ones alone of inventions disclosed in the present application will be summarized below.

In accordance with an aspect of the present invention, there is provided a magnetoresistive head in which an MR film and different bias films are formed, a first conductive film resistive to a reactive ion etching with use of a fluorocarbon-series gas is formed on the MR and bias films, and then a second conductive film to be formed as conductive electrodes is formed on the first conductive film.

In this case, the first conductive film should be non-magnetic and resistive to the reactive ion etching. It may be made of Cr or NiCr alloy film as mentioned later. Further, it may be made of Cr, V, Ag, Au, Cu, Pt and Pd. It may be a non magnetic metal alloy including at least two of Fe, Co, Ni, Cr, V, Ag, Au, Cu, Pt and Pd. Further, the first conductive film is required to be non-magnetic and not to contain two or more of Fe, Co and Ni. While the second conductive film is subjected to the reactive ion etching with use of the fluorocarbon-series gas for formation of conductive electrodes, the first conductive film can exhibit a high resistance to the over-etching of the MR film and thus can act as a protective film for avoiding the damage of the MR film.

In accordance with another aspect of the present invention, there is provided a method for manufacturing a magnetoresistive head in which a first conductive film resistive to a reactive ion etching with use of a fluorocarbon-series gas is formed on an MR and different bias films, a second conductive film is formed directly on the first conductive film as tightly contacted therewith at least partly and then subjected to the reactive ion etching.

The first conductive film is made of Cr, Ni-Cr, or at least one of Cr, V, Fe, Co, Ni, Ag, Au, Cu, Pt and Pd or an alloy thereof. Note that the first conductive film is required not to contain two or more of Fe, Co and Ni. The second conductive film is made of, for example, Nb, Ta, W or Mo.

The first conductive film resistive to the reactive ion etching with use of a fluorocarbon-series gas and formed on the MR film acts as a protective film for preventing the etching damage of the MR film and bias films (for applying a bias magnetic field) when the second conductive film for formation of conductive electrodes is subjected to the over-etching.

With such a structure, since the MR and bias films can be reliably protected from the reactive ion etching, such a situation can be avoided that when the thicknesses of the MR and bias films vary from their predetermined values, this undesirably involves variations in the characteristics of the MR element, which means in that the performances of the magnetoresistance effect type head can be reliably improved.

The requirement that the first film be electrically conductive is because a current must be passed from the conductive electrodes through the first conductive film to the MR film.

The above and other objects and novel features of the present invention will be obvious from the description in conjunction with the attached drawings.

DESCRIPTION OF THE PREFERRED EMBODIMENTS

Magnetoresistance effect type heads and their manufacturing methods in accordance with different embodiments of the present invention will be detailed with reference to the accompanying drawings.

Figure 1A:
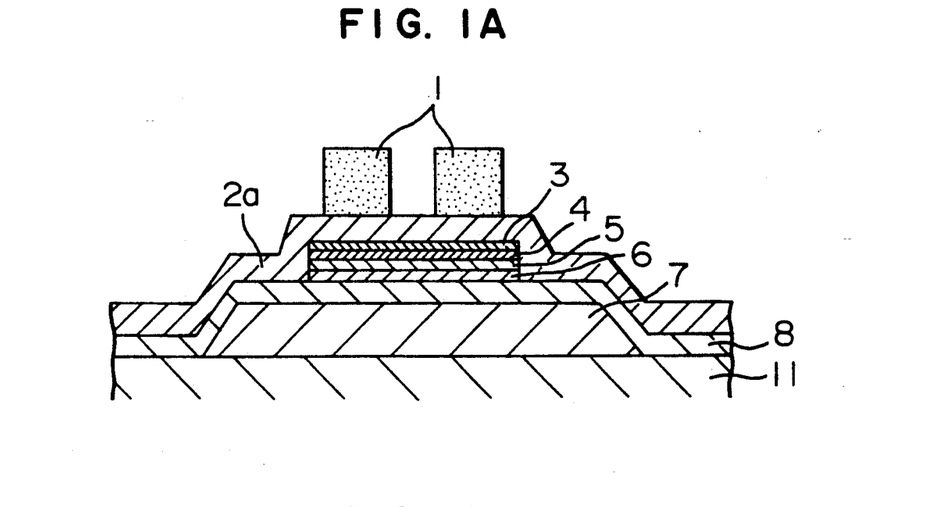
FIGS. 1A to 1C are cross-sectional views schematically showing exemplary sequential steps of a method for manufacturing a magnetoresistance effect type head in accordance with a first embodiment of the present invention.
Figure 1B:
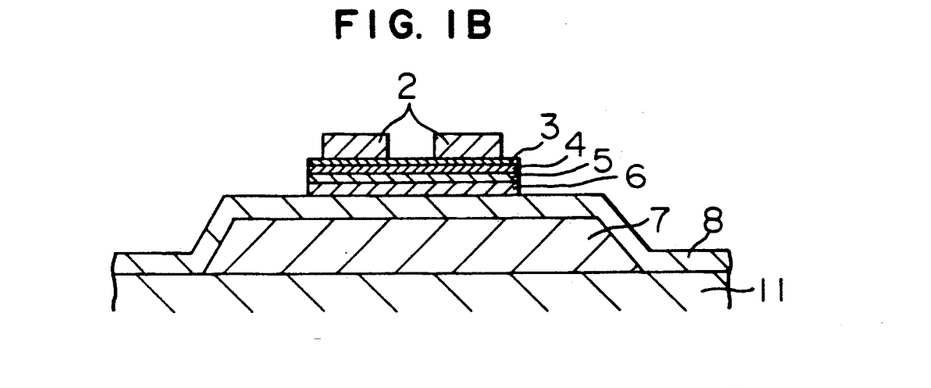
Figure 1C:
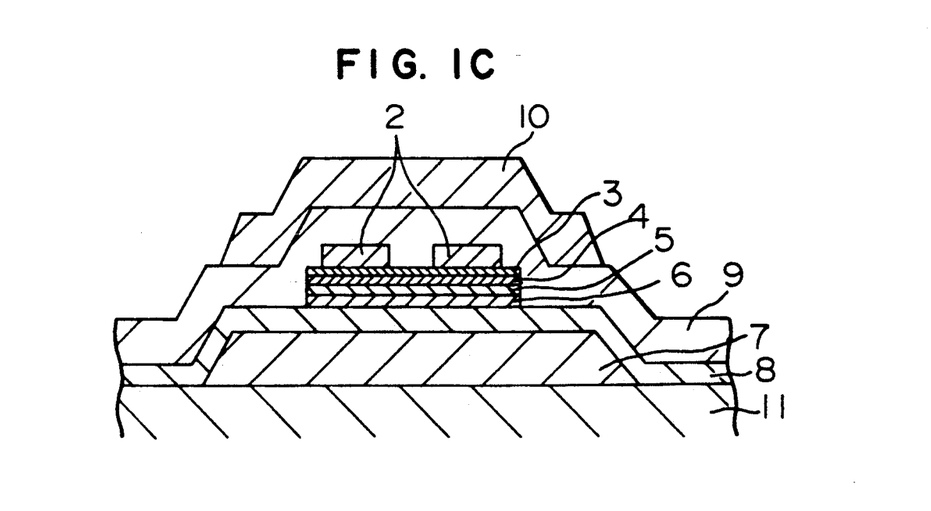
Figure 2A:
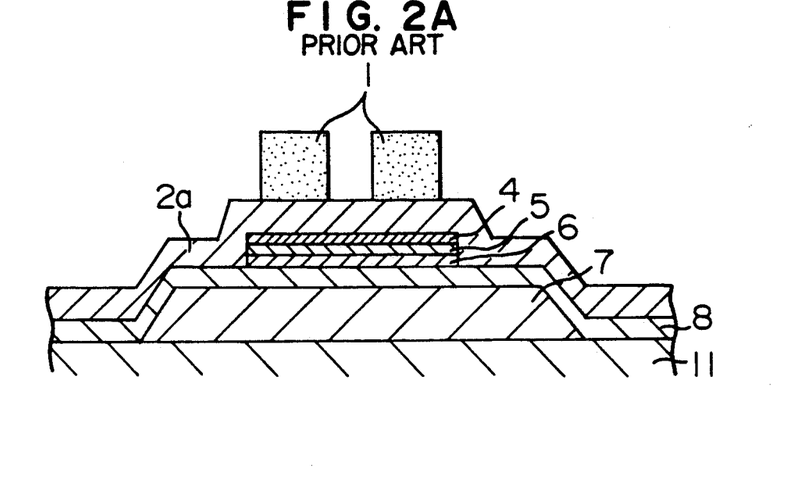
FIGS. 2A to 2C are cross-sectional views schematically showing exemplary sequential steps of a method for manufacturing a prior art magnetoresistance effect type head.
Figure 2B:
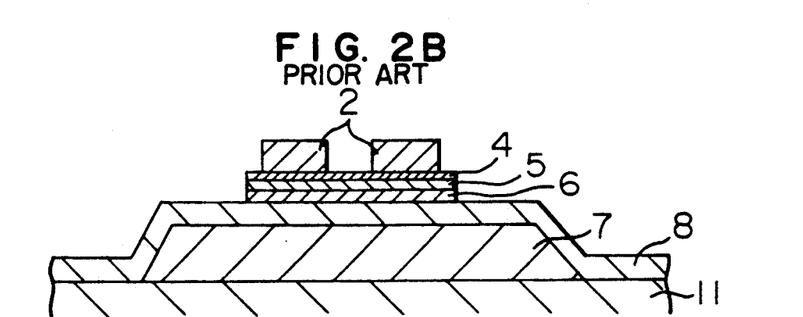
Figure 2C:
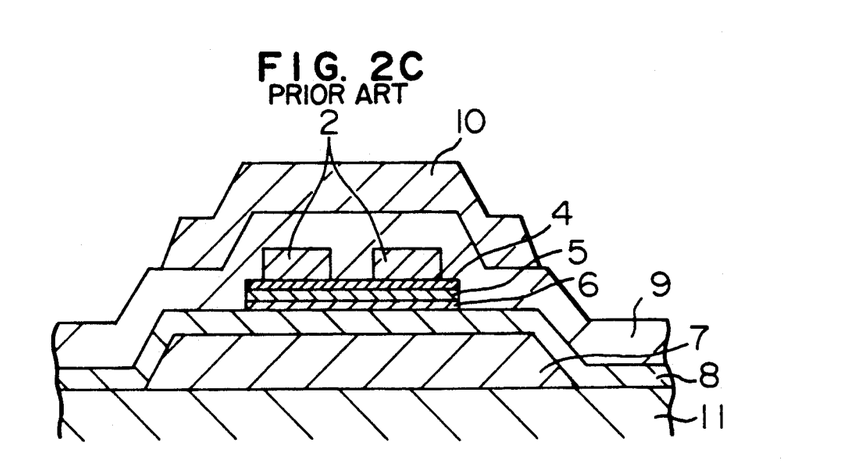

FIGS. 1A to 1C schematically show cross-sectional views showing exemplary steps of a method for manufacturing a magnetoresistance effect type head in accordance with an embodiment of the present invention; and FIGS. 2A to 2C schematically show cross-sectional views showing exemplary steps of a method for manufacturing a prior art magnetoresistance effect type head for comparison with the head of FIGS. 1A to 1C.

The inventors has confirmed a problem in the prior art magnetoresistance effect type head by comparing the manufacturing steps of the prior art head of FIGS. 2A to 2C with those of the head of the embodiment of FIGS. 1A to 1C.

More specifically, a lower magnetic shield film 7 of 1 $\mu$m thick is formed on a substrate 11 made of ceramic or the like material. Formed on the substrate 11 is a lower magnetic gap layer 8 made of $Al_2O_3$ having a thickness of 180-300 nm (200 nm in the present example). Formed on the gap layer 8 is a vertical bias film 12 (not shown but which will described later). Sequentially formed as stacked on the vertical bias film 12 are a permalloy MR film 6 of 20 nm thick, a shunt bias Nb film 5 of 15 nm thick and a soft bias film 4 of 20 nm thick and made of NiFeNb respectively in predetermined shapes. In the head of the first embodiment shown in FIG. 1A, such a Cr protective film 3 as to be described later is formed on the soft bias film 4. Further in the structures of FIGS. 1A and 2A, an electrode film 2a of 220 nm thick and made of Nb for formation of electrodes 2, and then a photoresist pattern 1 for formation of a mask are sequentially formed on the protective film 3.

The electrodes 2 of the electrode film 2a are subjected to a reactive ion etching (RIE) with use of a mixture gas of $CF_6$ and 5% of $O_2$ and with use of the photoresist pattern 1 as the mask to fabricate an MR element (refer to FIGS. 1B and 2B).

Formed on the MR element is an upper magnetic gap layer 9 made of $Al_2O_3$ and having a thickness of 140-240 nm (160 nm in the present embodiment), on which an upper magnetic shield film 10 is formed to thereby form a magnetoresistance effect type head (refer to FIGS. 1C and 2C). In this connection, the upper and lower magnetic shield films 10 and 7 may comprise an NiFe film, a CoTaZr film or an FeAlSi film.

Shown in FIGS. 2A to 2C are cross-sectional views of the magnetoresistance effect type head when viewed from a magnetic disk (not shown) toward the sliding surface of the head. The drawings to be given in the following are also the similar cross-sectional views. In this connection, the electrodes 2 may be made of Ta, W or Mo.

Also formed on the same substrate 11 is an MR element (not shown) having no such upper and lower magnetic shield films. As a result of measuring the MR element with respect to its voltage-magnetic field curve, it has been found that a bias magnetic field of the soft bias film is not substantially applied to the MR film. Further, the plus and minus sides of the waveform of a signal reproduced by the head are poor in their symmetry even when a sense current to the MR element is varied. This is because a proper horizontal bias is not applied from the soft bias film or shunt bias film to the MR film 6. In this way, no bias magnetic field is applied to the MR film 6. This is considered to be due to the fact that, during over-etching of the etching operation of the electrode film 2a, the soft bias film 4 and shunt bias film 5 on the MR film 6 are also exposed to the over-etching to be thereby damaged.

For the purpose of avoiding such a defect, as mentioned earlier, in the magnetoresistance effect type head and its manufacturing method of the present embodiment 1, the Cr protective film 3 (first conductive film) of 5 nm thick is formed on the soft bias film 4, the known photoresist is subjected to light exposure to form a mask, and then subjected to an ion milling with use of an argon gas to form such an island as shown (refer to the layers 3 to 6 in FIG. 1 or the layers 4 to 6 in FIG. 2). Formed on the island is the electrode film 2a (second conductive film) of 220 nm thick and made of Nb material. With the both structures of FIGS. 1A and 2A, the electrode film 2a is subjected to the reactive ion etching with use of the mixture gas of $CF_4$ and 5% of $O_2$ to form the electrodes 2. The formation of the Cr protective film by sputtering is required to be carried out at a temperature of below 200° C., because the film formation at temperatures above 200° C. causes Cr in the protective film to be diffused into the soft bias film, thus deteriorating its characteristics.

The material of the protective film 3 is not limited to the aforementioned Cr but may be any material, so long as the material is electrically conductive and highly resistive to the etching with use of the mixture gas of $CF_4$ and 5% of $O_2$. For example, the protective film 3 may be a non-magnetic, conductive film of Ni-Cr, V, Fe, Co, Ni, Cu, Pd, Ag, Pt, Au or the like of specific resistance above 40 $\mu\Omega$ cm, because current flowing through this film should be suppressed at a low level. In the reactive ion etching (RIE), $CF_4$ in the mixture gas may be replaced by an $SF_6$ gas.

When the magnetoresistance effect type head of the present embodiment thus manufactured is subjected to measurements for its voltage-magnetic field curve, it has been confirmed that bias magnetic field is increased with the increasing sense current so that a proper bias magnetic field can be applied. Further, when the head fabricated in such a manner as mentioned above is optimized in its sense current, a reproduced signal can be made highly symmetrical with respect to the plus and the minus components of an input signal.

Other heads having the Cr protective films 3 of 3 nm and 20 nm thick were fabricated. Our experiments have shown that, in the case of the head with the 3 nm-thick protective film 3, the protective film 3 disappears during the over-dry etching and the head exhibits a poor bias characteristic; in the case of the head with the 20 nm-thick protective film 3, a portion of the sense current flowing through the protective film 3 becomes large. Since the magnetic field applied to the soft film 4 under the influence of the current flowing through the protective film is opposite in direction to the magnetic field applied to the soft bias film 4 under the influence of the current flowing through the shunt bias current 5 and MR films, these heads exhibited poor bias characteristics. Thus, it is considered that the thickness of the protective film is preferably between about 5 and 16 nm. The thickness of the soft bias film is in a range of between 20 and 30 nm. The shunt bias film has a thickness of preferably 15-20 nm. It is preferable that the MR film has a thickness of 15-30 nm. Saturation magnetic flux densities Bs of the soft bias film 4 and MR film 6 were 0.6-1.0 T and 0.9-1.1 T respectively.

More specifically, even in the case where the film is made of conductive material, the thickness of the film is made as thin as nearly the mean free path of free electrons, the electric resistive value of the film becomes large. Thus, the aforementioned problem is avoided by making the protective film 3 as thin as about 5-16 nm to reduce the current flowing through the film 3. The conductivity of the protective film 3 is large with respect to the current flowing through the film in its thickness direction and thus no troubles take place in the current flow from the electrode 2 through the protective film 3 to the MR film 6.

Figure 3:
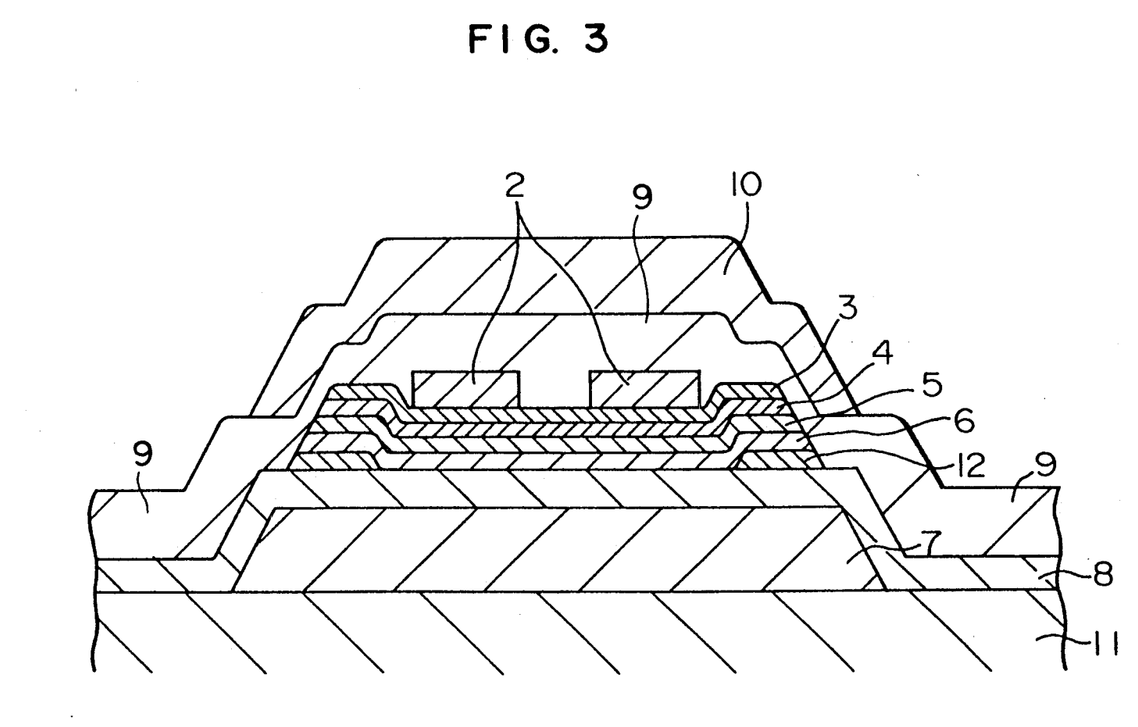
FIG. 3 is a cross-sectional views schematically showing exemplary sequential steps of a method for manufacturing a magnetoresistance effect type head in accordance with a second embodiment of the present invention.

FIG. 3 shows a further detailed structure of the MR element shown in FIG. 1C. It is already known that the provision of the vertical bias film 12 and the soft bias film 4 improves the characteristics of the magnetoresistance effect type element. The vertical bias film may comprise an anti-ferromagnetic film made of NiO or FeMn, a two-layer permanent magnet film of a CoCrTa layer and a Cr layer, or a permanent magnet film made of CoPt or CoPtCr.

Figure 4A:
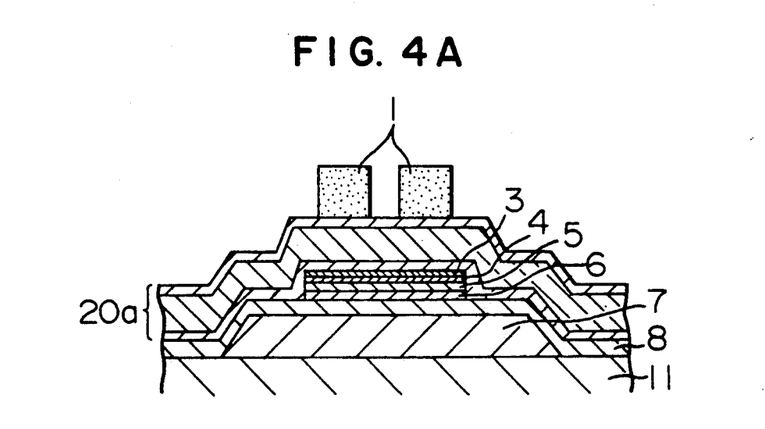
FIGS. 4A to 4C are cross-sectional views schematically showing exemplary sequential steps of a method for manufacturing a magnetoresistance effect type head in accordance with a third embodiment of the present invention.
Figure 4B:
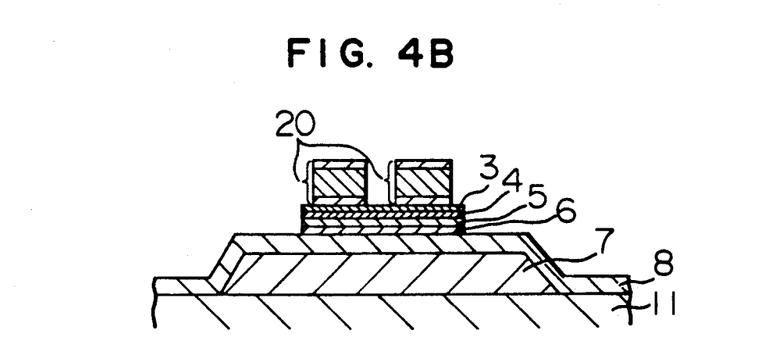
Figure 4C:
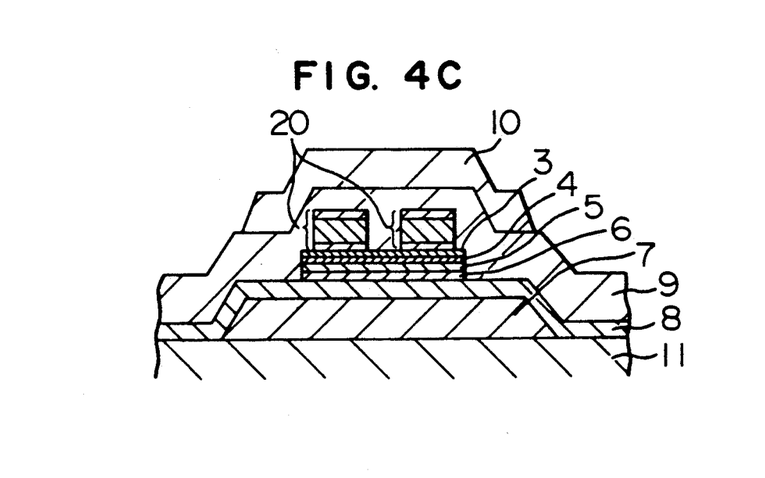

A magnetoresistance effect type head and its fabricating method in accordance with a second embodiment are shown by its fabricating steps in FIGS. 4As to 4C. In the present embodiment, an electrode film 20 is made up of three layers, that is, Nb layers (of 20 nm and 60 nm thick) and an Au layer of a small resistivity sandwiched by the Nb layers.

More specifically, an electrode film 20a comprising the aforementioned 20 nm-thick Nb, 140 nm-thick Au and 60 nm-thick Nb layers for formation of the electrode 20 is formed on a protective film 3, and a photoresist pattern 1 is formed on the electrode film 20a (refer to FIG. 4A).

The upper Nb and Au layers (of 20 nm and 140 nm thick, respectively) is then subjected to an ion milling with use of the photoresist pattern 1 as a mask. In this process, the lowermost Nb layer (of 60 nm thick) of the electrode film 20a functions as an ion milling stopper. The upper Nb layer acts to improve the contact tightness with an $Al_2O_3$ film (to be explained later). The material Nb may be replaced by other suitable material, such as Cr, Ti, Ta, Mo, V, as necessary. Next, the resultant structure is subjected to a reactive ion etching (RIE) with use of a mixture gas of $CF_4$ and 5% of $O_2$ to remove the remaining lower Nb layer (refer to FIG. 4B). For the purpose of reducing the number of steps, an element not having the upper Nb layer formed therein may be formed.

Subsequently, as in the first embodiment, an upper magnetic gap layer 9 made of $Al_2O_3$ material and of 160 nm thick is formed on the resultant structure, and an upper magnetic shield film 10 is formed on the upper magnetic gap layer 9 (refer to FIG. 4C) to thereby form a magnetoresistance effect type head. As a result of measuring the MR element without the upper and lower magnetic shield films fabricated on the same substrate 11 with respect to its voltage-magnetic field curve, it has been confirmed that its sense current and bias magnetic field can both be increased and a suitable bias magnetic field can be applied. The head fabricated in such a manner as mentioned above, when the sense current is optimized, exhibited a reproduced signal having a good symmetrical waveform to an input signal. In addition, the noise of the head could be more reduced than that of the first embodiment.

Figure 5A:
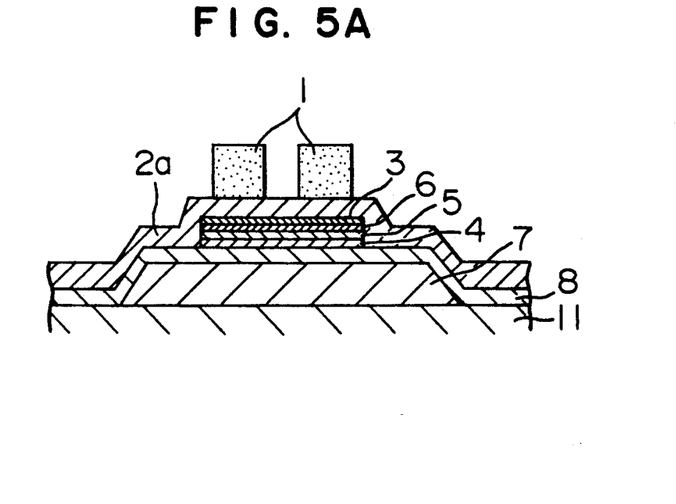
FIGS. 5A to 5C are cross-sectional views schematically showing exemplary sequential steps of a method for manufacturing a magnetoresistance effect type head in accordance with a fourth .embodiment of the present invention.
Figure 5B:
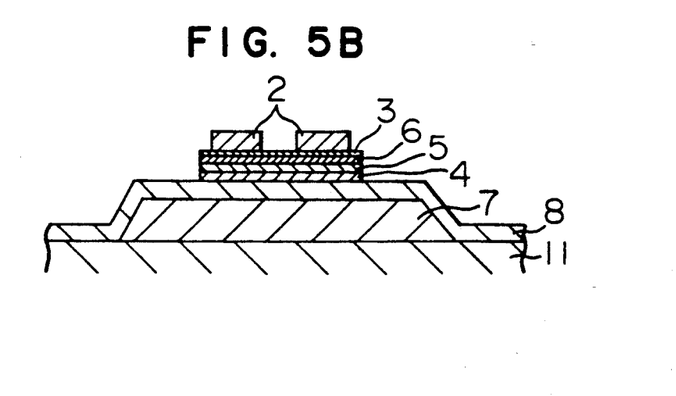
Figure 5C:
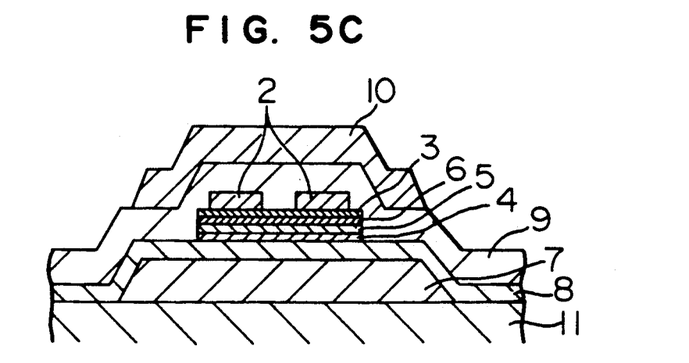

Shown in FIG. 5 is a third embodiment of the present invention, in which the soft bias film 5 and the MR film 6 are exchanged in the structure of the first or second embodiment. Even with the structure of the third embodiment, a head having a good bias characteristic was obtained. Even in this case, when the electrode 20 is made of the electrode film 20a comprising 3 Nb (20 nm), Au (140 nm) and Nb (60 nm) layers, the head noise can be more suppressed.

A fourth embodiment corresponds to the magnetoresistance effect type head of the first or second embodiment but the soft bias film 4 is removed therefrom.

Figure 6A:
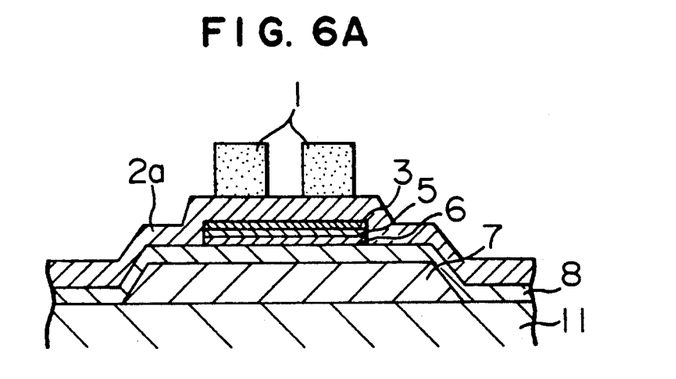
FIGS. 6A to 6C are cross-sectional views schematically showing exemplary sequential steps of a method for manufacturing a magnetoresistance effect type head in accordance with a fifth embodiment of the present invention.
Figure 6B:
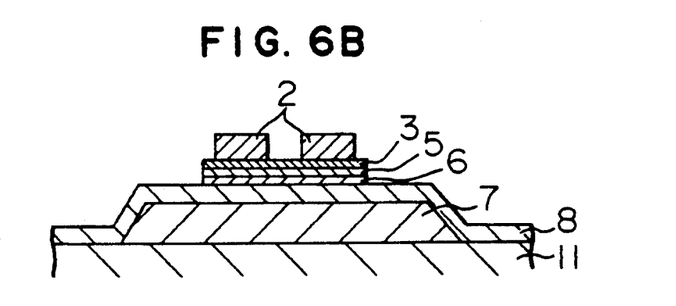
Figure 6C:
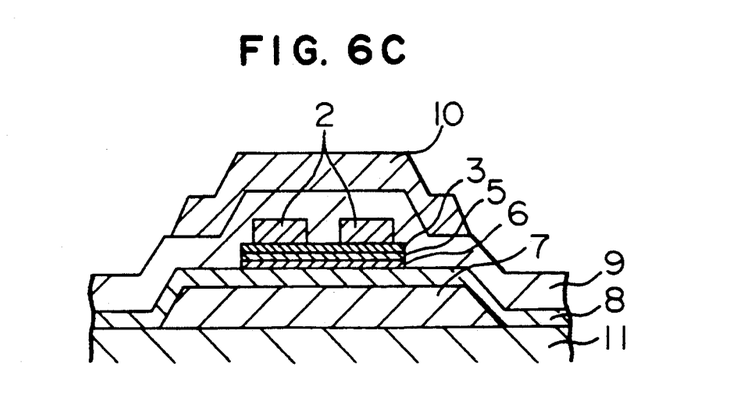

Even in the fourth embodiment, a head having a good bias characteristic could be obtained. The fabricating steps of the magnetoresistance effect type head of the fourth embodiment are shown in FIGS. 6A to 6C. The shunt bias film 5 is made of, for example, Nb having a thickness of preferably 27–50 nm, while the MR film 6 is made to have a thickness of preferably 15–30 nm.

Even in the fourth embodiment, if an electrode 20 is used, made of the electrode film 20a comprising 3 Nb (20 nm), Au (140 nm) and Nb 60 nm) layers, the head noise can be more suppressed.

A fifth embodiment, though not specifically shown, corresponds to the structure of the fourth embodiment but the shunt bias film 5 and the MR film 6 are exchanged. Even with the present structure, a head having a good bias characteristic could be obtained.

Figure 7:
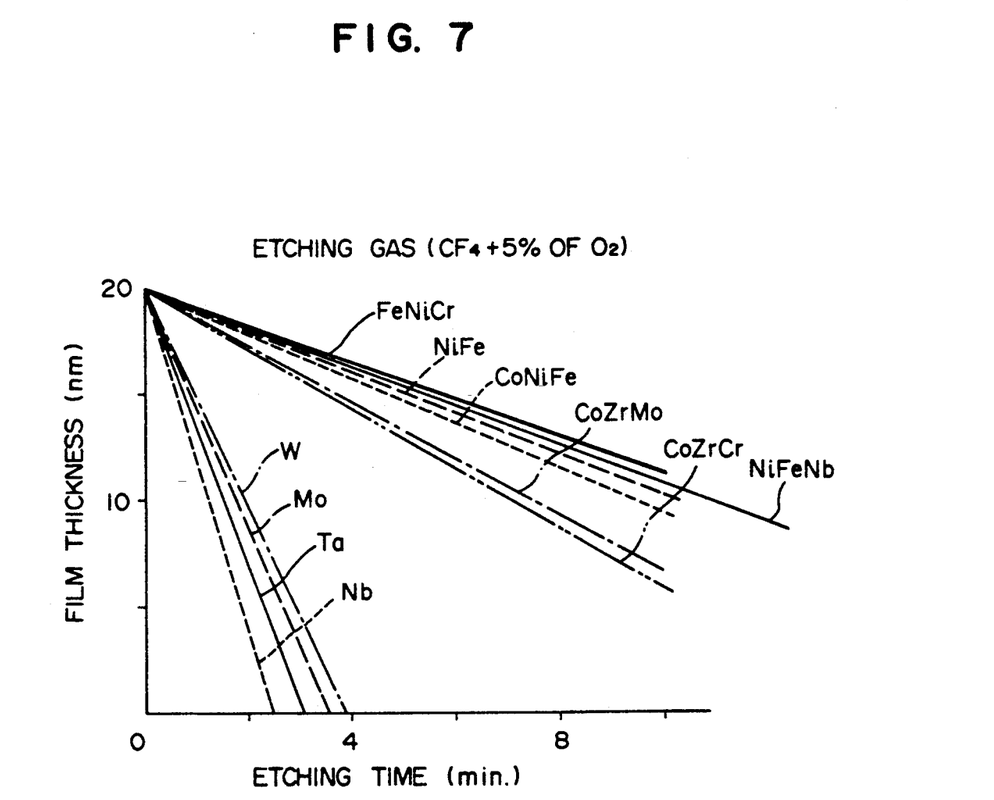
FIG. 7 is a characteristic diagram showing exemplary measured results of relationships between the thickness of various thin films and etching time in a method for manufacturing a magnetoresistance effect type head in accordance with a seventh embodiment of the present invention.

In a sixth embodiment, the MR film 6 of 20 nm thick and made of permalloy; any of an Ni-Fe-Nb ternary alloy film, a Co-Ni-Fe ternary alloy film, an Fe-Ni-Cr alloy film, a Co-Zr-Mo amorphous film and Co-Zr-Cr amorphous film, usable as the soft bias film 4; and Nb, Ta, Mo and W films were exposed to a reactive ion etching environment with use of a mixture gas of $CF_4$ and 5% of $O_2$ corresponding to the over-etching at the time of processing the electrode 2 or 20, and damages of the films were examined. The examined results are shown in FIG. 7.

As shown, when the Ni-Fe-Nb ternary alloy film, permalloy film (Ni-Fe), Co-Ni-Fe ternary alloy film, Fe-Ni-Cr alloy film, Co-Zr-Mo amorphous film and Co-Zr-Cr amorphous film are subjected to 4 minutes of reactive ion etching (RIE), corresponding to the over-etching of the processing of the electrode 2 (20), the thicknesses of these films are reduced by 4–6 nm. That is, these films are damaged by the RIE process. As a result of the similar experiments conducted on Co-Zr-Ta, Co-Zr-Nb and Co-Hf-Ta-Nb films as other Co-series amorphous films, it has been found that these materials are also damaged by the RIE process.

The Ta, Mo and W film are completely removed through 4 minutes of the RIE process.

When it is desired to use these films as the aforementioned MR film or various bias films, the damage to these films during the RIE process must be prevented.

For the purpose of preventing the damage, a protective film made of Cr and Ni-Cr non-magnetic alloy was formed on these films to have a thickness of 3 nm, 5 nm, 8 nm or 10 nm, and then subjected to a reactive ion etching with use of a mixture gas of $CF_4$ and 5% of $O_2$. As a result, since the 3 nm-thick protective film of Cr and Ni-Cr alloy is removed through the RIE process within 4 minutes, the MR film or bias film located below the protective film are damaged. However, when the thickness of the protective film of Cr and Ni-Cr alloy is made to be more than 5 nm, since the protective film is not removed through 4 minutes of the RIE process, the damage of the MR or bias film located below the protective film can be avoided.

As a protective film other than the Cr and Ni-Cr protective films, a V, Fe, Ni, Cu, Pd, Ag, Pt or Au film or an alloy film thereof is preferable because of their high resistance to the reactive ion etching (RIE) with $SF_6$ or $CF_4$ gas.

Although the invention has been explained in the foregoing in conjunction with the embodiments, it goes without saying that the present invention is not limited to these embodiments but may be modified in various ways without departing from its subject matter.

What is claimed is:

1. A magnetoresistance effect type head comprising:
a ceramic substrate;
a first magnetic film provided on said ceramic substrate;
a second magnetic film provided adjacent said first magnetic film;
first and second insulating films provided between said first and second magnetic films;
a magnetoresistance effect type film provided between said first and second insulating films;
a bias film provided between said first and second insulating films and in contact with said magnetoresistance effect type film, for applying a magnetic field to said magnetoresistance effect type film;
a first conductive film member provided between said first and second insulating films and above said bias film; and
a pair of second conductive film members positioned between said first and second insulating films, separated from each other, and in contact with said first conductive film member.

2. A magnetoresistance effect type head as set forth in claim 1, wherein said first conductive film member is a chromium film of less than 10 nm thickness.

3. A magnetoresistance effect type head as set forth in claim 1, wherein said first conductive film has a thickness of about 5–16 nm.

4. A magnetoresistance effect type head as set forth in claim 1, further comprising a third magnetic film member in contact with said bias film.

5. A magnetoresistance effect type head as set forth in claim 1, wherein said first conductive film member is a nickel-chromium film which is of less than 10 nm thickness and which is resistive to a fluorocarbon-series etching gas.

6. A magnetoresistance effect type head as set forth in claim 1, wherein said second conductive film members are made of a metal which is able to be etched with a fluorocarbon-series gas and which has a thickness of at least 100 nm.

7. A magnetoresistance effect type head as set forth in claim 1, wherein each of said second conductive film members includes a first metallic layer and a second metallic layer having a conductivity larger than said first metallic layer and a thickness larger than said first metallic layer.

8. A magnetoresistance effect type head as set forth in claim 1, wherein each of said second conductive layer includes two metallic layers having contact tightness to said second insulating film and a third metallic layer which is sandwiched between said two metallic layers and which has a conductivity larger than said two metallic layers and a thickness larger than said two metallic layers.

9. A magnetoresistance effect type head as set forth in claim 1, wherein said magnetoresistance effect type film, and bias film and said first conductive film are ion milled films and said second conductive film is a reactive ion etched film.

10. A magnetoresistance effect type head comprising:
a lower magnetic shield film;
a lower gap film made of an insulating material;
an upper gap film made of an insulating material;
an upper magnetic shield film;
a magnetoresistance effect type film
at least one bias film for applying a horizontal bias magnetic field to said magnetoresistance effect type film, said magnetoresistance effect type film and said bias film being provided between said lower and upper gap films;

a pair of conductive electrodes for passing a signal detection signal to said magnetoresistance effect type film;

a first conductive film provided on one of said magnetoresistance effect type film and said bias film and resistive to reactive ion etching with a fluorocarbon-series gas; and a second conductive film provided immediately above said first conductive film and able to be etched with the fluorocarbon-series gas.

11. A magnetoresistance effect type head as set forth in claim 10, wherein said first conductive film is made of at least one of Cr, V, Fe, Co, Ni, Cu, Pd, Ag, Pt and Au or an alloy thereof, and said second conductive film is made of at least one of Nb, Ta, W, Mo and Ti to form at least part of said conductive electrodes.

12. A magnetoresistance effect type head as set forth in claim 10, wherein:

said bias film comprises a first bias film layer made of non-magnetic, conductive material and a second bias film layer made of soft magnetic material;

said magnetoresistance effect type film and said first and second bias film layers are stacked in an arbitrary sequence to form a laminate; and said first and second conductive films are sequentially stacked on said laminate.

13. A magnetoresistance effect type head as set forth in claim 10, wherein said second conductive film has a 3-layer structure of Nb, Au and Nb.

14. A magnetoresistance effect type head as set forth in claim 10, wherein said first conductive film is made of at least one of Cr, V, Fe, Co, Ni, Cu, Pd, Ag, Pt and Au or an alloy thereof and said second conductive film is a two-layered structure composed of a layer of Au and a layer of at least one of Nb, Ta, W, Mo and Ti.

15. A magnetoresistance effect type head as set forth in claim 10, wherein said first conductive film is made of at least one of Cr, V, Fe, Co, Ni, Cu, Pd, Ag, Pt and Au or an alloy thereof and said second conductive film is a three-layered structure composed of a layer of Au and two separate layers each composed of at least one of Nb, Ta, W, Mo and Ti.

* * * * *